United States Patent
Konishi et al.

[11] Patent Number: 5,745,912
[45] Date of Patent: Apr. 28, 1998

[54] MEMORY CARD APPARATUS INCLUDING A LINK TABLE FOR MANAGING THE CORRESPONDENCY BETWEEN THE RECORDED CONTENTS IN THE MEMORY CARD AND THAT IN THE LINK TABLE

[75] Inventors: Kazuo Konishi; Shimpei Yoshioka; Koji Maruyama; Tomoyuki Maekawa, all of Yokohama; Toshiaki Sato, Fukaya, all of Japan

[73] Assignee: Kabushiki Kaisha Toshiba, Kawasaki, Japan

[21] Appl. No.: 704,354

[22] Filed: Aug. 28, 1996

Related U.S. Application Data

[63] Continuation of Ser. No. 41,251, Apr. 1, 1993, abandoned.

[30] Foreign Application Priority Data

| Apr. 2, 1992 | [JP] | Japan | 4-080931 |
| Apr. 3, 1992 | [JP] | Japan | 4-082258 |
| May 8, 1992 | [JP] | Japan | 4-116017 |

[51] Int. Cl.$^6$ .................................................. G06F 12/16
[52] U.S. Cl. ................... 711/103; 711/156; 395/182.13; 395/559
[58] Field of Search ........................... 395/405, 430, 395/482, 483, 488, 489, 497.03, 497.04, 412, 181, 182.03, 182.06, 182.13, 183.01, 183.18, 185.01; 365/185.33, 230.03; 711/103, 155, 156, 161, 162, 172, 173

[56] References Cited

U.S. PATENT DOCUMENTS

| 4,752,678 | 6/1988 | Rikuna | 235/380 |
| 4,877,945 | 10/1989 | Fujisaki | 235/379 |
| 4,887,234 | 12/1989 | Iijima | 235/380 |
| 5,293,236 | 3/1994 | Adachi et al. | 348/231 |
| 5,307,470 | 4/1994 | Kataoka et al. | 395/425 |
| 5,341,493 | 8/1994 | Yanai et al. | 395/488 |

FOREIGN PATENT DOCUMENTS

| 0292658 | 11/1988 | European Pat. Off. |
| 0492450 | 7/1992 | European Pat. Off. |
| 1154398 | 6/1989 | Japan |
| 1231142 | 9/1989 | Japan |
| 1236389 | 9/1989 | Japan |
| 1276495 | 11/1989 | Japan |

OTHER PUBLICATIONS

Patent Abstracts of Japan, Vo. 13, No. 12 (P-812) 12 Jan. 1989 & JP-A-63 219 045 (Hitachi Ltd) 12 Sep. 1988.

*Primary Examiner*—Eddie P. Chan
*Assistant Examiner*—Hiep T. Nguyen
*Attorney, Agent, or Firm*—Cushman Darby & Cushman IP Group of Pillsbury Madison & Sutro LLP

[57] ABSTRACT

A memory card apparatus has an EEPROM as a semiconductor memory. Each time data is written in the EEPROM, link data representing a recording location of the data is written and managed in a link table. The link table has a flag region with a flag which is set when data write in the EEPROM is requested and is reset when the link data has completely been written in the link table. In case of card removal during operation or power failure, the flag set in the flag region of the link table is not reset and remains. Thus, by checking the flag area of the link table, the occurrence of card removal during operation or power failure can be detected, and various countermeasures can be conducted. Thus, the correspondency between the recorded contents in the EEPROM and the contents in the link table can be maintained as much as possible.

16 Claims, 9 Drawing Sheets

| ITEMS OF COMPARISON | SRAM CARD | EEPROM CARD |
|---|---|---|
| 1. BACKUP CELL | PROVIDED | NOT PROVIDED |
| 2. COST | HIGH | RELATIVELY LOW |
| 3. WRITE SPEED (RANDOM) | HIGH | LOW |
|    (PAGE) | — | RELATIVELY HIGH |
| 4. READ SPEED (RANDOM) | HIGH | LOW |
|    (PAGE) | — | RELATIVELY HIGH |
| 5. ERASE MODE | NOT PROVIDED | PROVIDED |
| 6. WRITE VERIFY | UNNECESSARY | NECESSARY |

F I G. 1

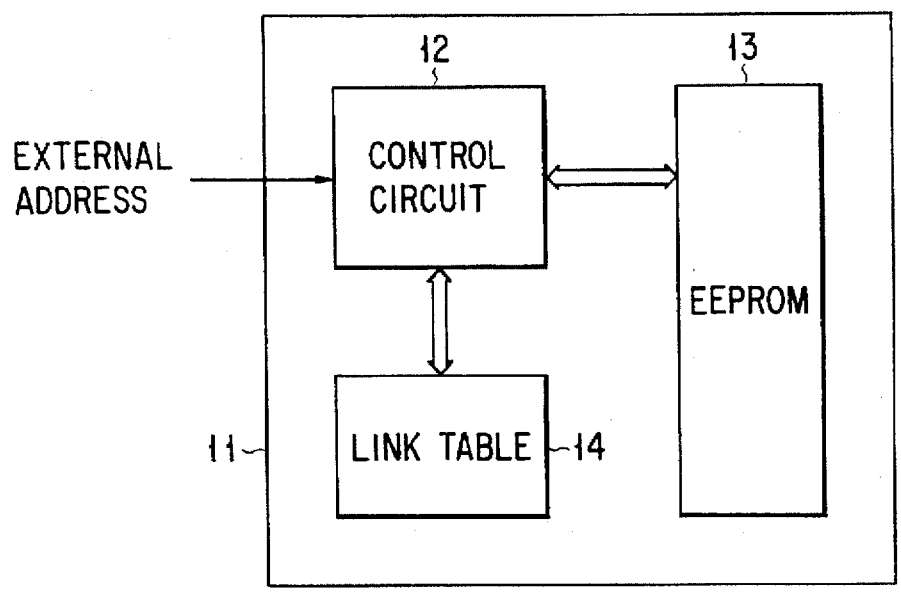
F I G. 2
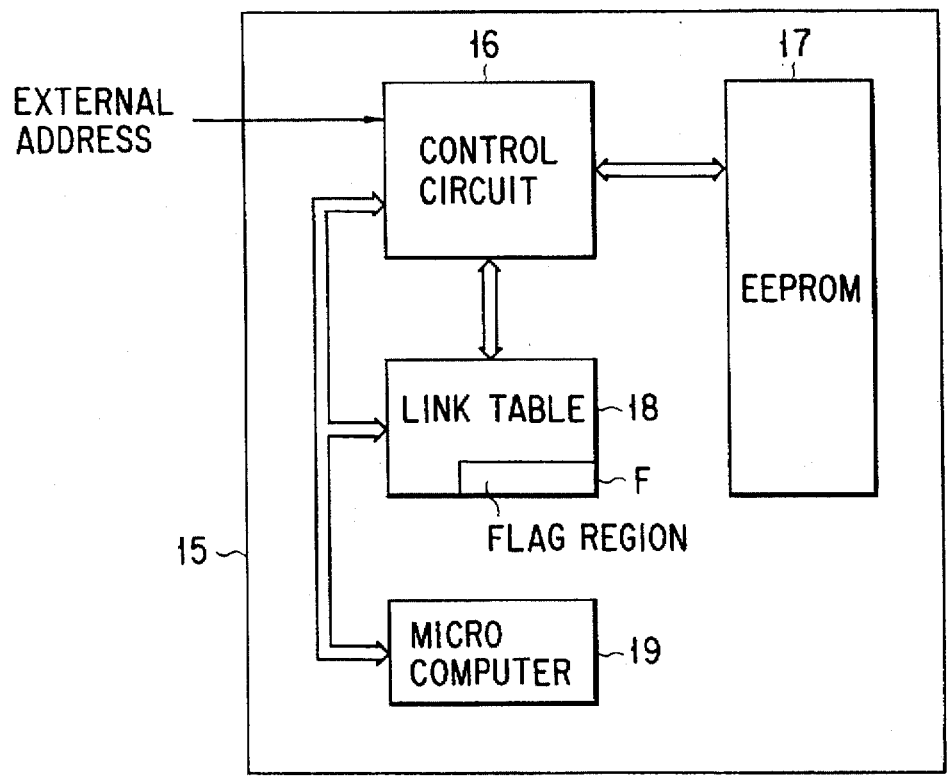
F I G. 3

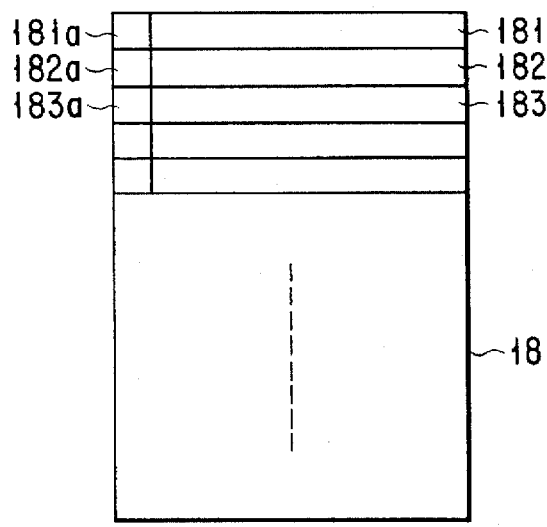
F I G. 4A
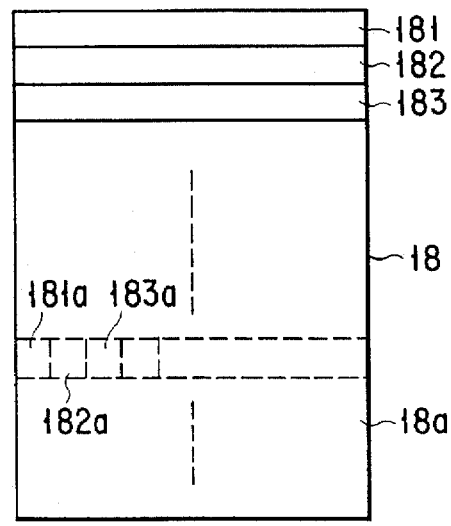
F I G. 4B
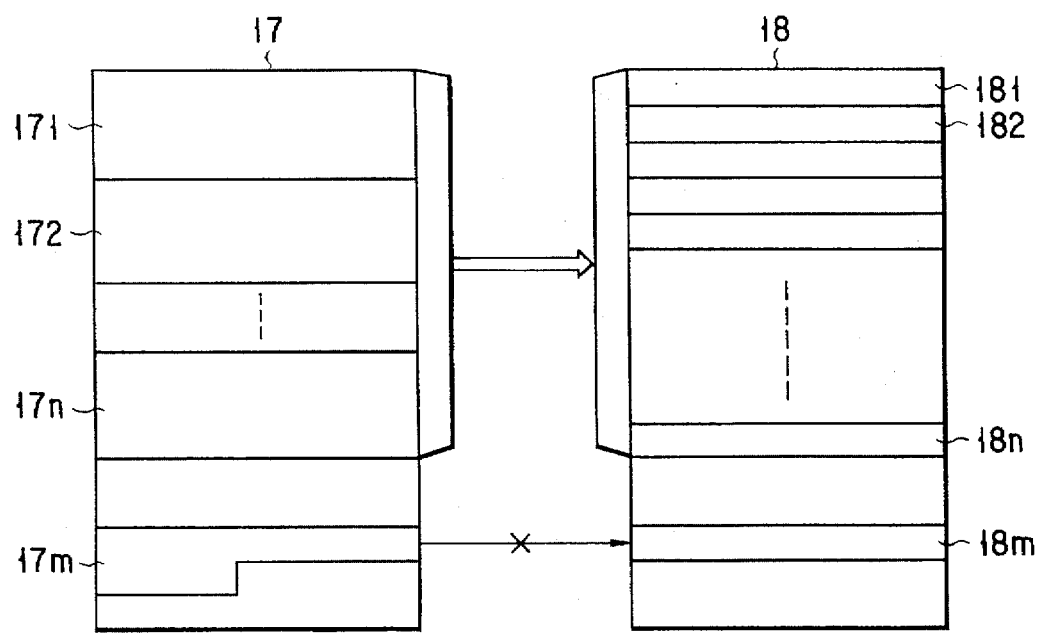
F I G. 5

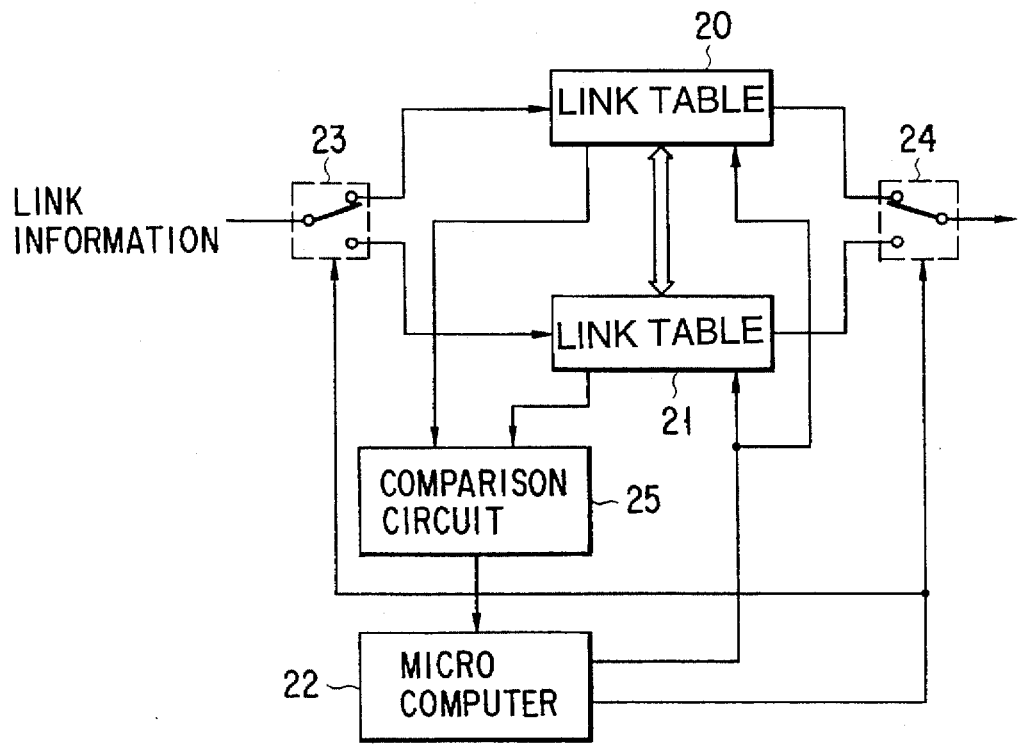
F I G. 6
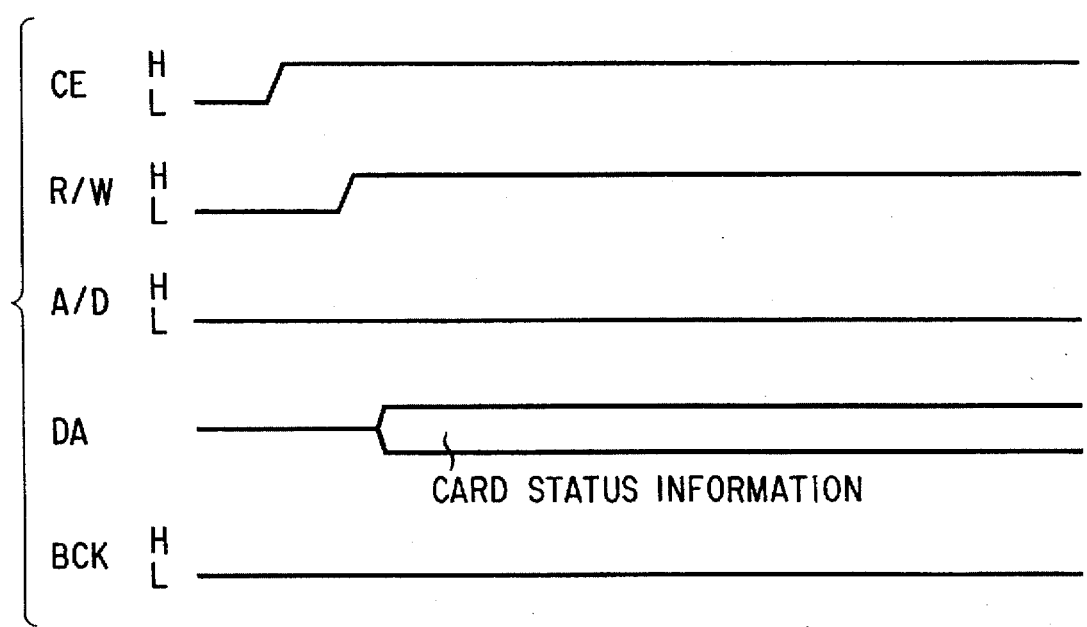
F I G. 8

MEMORY CARD APPARATUS INCLUDING A LINK TABLE FOR MANAGING THE CORRESPONDENCY BETWEEN THE RECORDED CONTENTS IN THE MEMORY CARD AND THAT IN THE LINK TABLE

This is a continuation of application Ser. No. 08/041,251, filed on Apr. 1, 1993, which was abandoned.

BACKGROUND OF THE INVENTION

1. Field of the Invention

The present invention relates to a memory card apparatus having an EEPROM (Electrically Erasable and Programmable Read-Only Memory) as a semiconductor memory in a card-shaped casing, and more particularly to a memory card apparatus applicable suitably to an electronic still-camera apparatus or the like wherein an optical image of a photographed object is converted to digital image data and the digital image data is recorded in a semiconductor memory.

2. Description of the Related Art

As is well known, an electronic still-camera apparatus has recently been developed, wherein an optical image of a photographed object is converted to an electric image signal by means of a solid pickup element such as a CCD (Charge-Coupled Device) and the image signal is converted to digital image data, which is then recorded in a semiconductor memory. In this type of electronic still-camera apparatus, a memory card containing a semiconductor memory in a card-shaped casing is removably attached to a camera body, thereby enabling the memory card to be handled like a regular film in a conventional camera.

Standardization of memory cards used in electronic still-camera apparatuses has been developed. A semiconductor memory contained in the memory card must have a large memory capacity for storing data of a plurality of digital images. For example, an SRAM (Static Random Access Memory), a mask ROM, or an electrically erasable programmable read-only memory (EEPROM) may possibly be used as the semiconductor memory. In particular, a memory card using the SRAM is used in a electronic still-camera apparatus which has already been marketed.

The memory card using the SRAM can match with any type of data format and has a high data write speed and a high data read speed. However, since a backup cell must be mounted in the memory card to maintain written data, the memory capacity is reduced by the provision of the space for installation of the cell. In addition, since the SRAM itself is expensive, the use of the SRAM is not advantageous in cost-effectiveness.

In order to solve the problems of the SRAM, attention has recently been paid to the use of the EEPROM as the semiconductor memory used in the memory card. The EEPROM is regarded as a promising new recording medium which will be substituted for magnetic disks. The EEPROM does not require a backup cell for maintaining data, and the cost of the chip itself can be reduced. Because of such special advantages that the SRAM does not have, researches and developments are widely made for the use of the EEPROM in memory cards.

FIG. 1 shows the advantages and disadvantages of the memory card (SRAM card) using the SRAM and the memory card (EEPROM card) using the EEPROM. As has been stated above, the SRAM requires the provision of the backup cell (item 1 of comparison) and the manufacturing cost (item 2) thereof is high. By contrast, the EEPROM card does not require the backup cell, and the cost thereof is relatively low.

Regarding the write speed (item 3) and read speed (item 4), consideration will now given to the random access mode (common to the SRAM and EEPROM) in which data is written and read in units of a byte or a bit designated voluntarily by an address, and the page mode (peculiar to the EEPROM) in which data is written and read in units of a page consisting of consecutive bytes (several hundred bytes) by designating a page.

In the random access mode, the SRAM has a high write speed and a high read speed, whereas the EEPROM has a low write speed and a low read speed. On the other hand, in the page mode, since the EEPROM is capable of writing and reading a large quantity of data of one page at a time, the data write speed and data read speed in the page mode are slightly higher than in the random access mode.

The erase mode (item 5) is peculiar to the EEPROM, and the SRAM does not have it. In the EEPROM, when new data is written on a region in which data has already been written ("data rewrite"), the already written data must be erased before new data is written. Thus, the erase mode is executed in rewriting data.

The erase mode includes a batch erase mode in which all data recorded in the EEPROM is erased at once, and a block erase mode in which data is erased in units of a block consisting of consecutive pages by designating the block.

The write verify mode (item 6) is also peculiar to the EEPROM and is not provided in the SRAM. Specifically, normally, data cannot completely be written in the EEPROM in a single write operation. Thus, each time one write operation is performed, the written data is read out from the EEPROM to check whether the data has been correctly written. This mode is called "write verify."

More specifically, in the write verify, data to be written in the EEPROM is recorded in a buffer memory, and the data is transferred from the buffer memory to the EEPROM and thus the data is written in the EEPROM. The written data is read out from the EEPROM and compared with the contents in the buffer memory. If the contents of the EEPROM are not identical to those of the buffer memory ("error"), the contents of the buffer memory is written in the EEPROM once again, and the written contents are read out and compared with the contents of the buffer memory. This operation is repeated.

As is clear from the above comparison data, the EEPROM has special advantages which the SRAM does not have: e.g. the backup cell is not provided, the cost of the chip itself is low, and data can be written and read in units of a page. On the other hand, the EEPROM has disadvantages: the data write and read speeds in the random access mode are low, and the erase mode and write verify mode, which are not required in the SRAM, are provided.

When the EEPROM is substituted for the currently used SRAM as semiconductor memory used in the memory card, it is necessary to solve the problems associated with the data write speed and data read speed as well as the erase mode and write verify. That is, it is necessary to made various improvements, thereby enabling the EEPROM card to be handled like the SRAM card.

In this case, an important problem, among others, is that the number of data write operations and the data retention time are limited in the EEPROM, unlike the SRAM or DRAM. The guaranteed number of times of write operations in the EEPROM is normally $10^4$ operations, and the guaranteed data retention time is 10 years. Thus, a defect is likely to occur in the memory cell itself of the EEPROM which is used over the guaranteed number of times of write operations or guaranteed data retention time, resulting in a defective memory region incapable of normally storing and retaining data.

This being the case, the EEPROM memory card is provided with a defect-compensation function for protecting data which cannot be written in the EEPROM owing to the defective memory region. In the case where a defective memory region in the EEPROM memory card corresponds to an externally designated data write address, another normal memory region in the memory card is searched and data is written in this normal memory region. The address of this normal memory region is associated with the externally designated address by a link table and the correspondency of the addresses is managed. This complex internal processing makes the system structure very complex.

FIG. 2 shows the structure of a memory card having a defect-compensation function for compensating a defective memory region in an EEPROM. An external data write address is supplied to a memory card 11. Specifically, the external address is supplied to a control circuit 12 in the memory card 11. The control circuit 12 searches for an actual address in an EEPROM (main memory) 13 corresponding to the input external address by referring to a link table 14.

The control circuit 12 assigns an actual address obtained by referring to the link table 14 to the EEPROM 13, and writes data on a region associated with the actual address. Then, the control circuit 12 writes in the link table 14 data representing the quantity of written data in the EEPROM 13, i.e. data representing the address in the EEPROM 13 up to which data has been written. Thus, the data write process is completed.

In the case where the memory card having the above-described internal processing system is applied to a commercially available product, e.g. where the memory card is mounted in an electronic still-camera apparatus, the following problems may arise: the memory card may be removed from the apparatus body while some internal processing is being performed in the memory card ("card removal during operation") or a power failure may occur, in which case the recorded contents in the memory card may be damaged because the internal processing is very complex.

For example, if the card removal during operation occurs during data write in the EEPROM 13, the rewrite in the link table 14 is not possible after data write in the EEPROM 13 and therefore the recorded contents in the EEPROM 13 becomes inconsistent with the contents in the link table 14. Thereafter, the data write and read of the EEPROM 13 will not be normally executed.

In fact, in the EEPROM 13, when new data is written in a region which has already stored data, the previous data must be erased to write new data. The erase operation consumes a considerable time. Thus, in order to use the memory card in a system designed for high speed operations, it is necessary to reduce the number of times of erase operations as much as possible. The memory card system must be constructed so as to perform an erase operation only at the time of overwriting new data in a region storing previous data. For this purpose, it is determined by referring to the link table 13 whether a region, in which new data is to be written, is a region which has already stored some data.

If the card removal during operation occurs while the link table 14 is being rewritten, the new data has been written in the EEPROM 13 despite the fact that the link table 14 does not have an indication of "already written." In this case, when a data write request is input to write new data in an "already written" region in the EEPROM 13, the data in the "already written" region is not erased and new data is written. Consequently, data is lost by a defective write operation.

Further, since card removal during operation or a power failure occurs accidentally, it is very difficult to know the occurrence of the card removal during operation or that region in the EEPROM 13 which is inconsistent with the contents of the link table 14.

As has been described above, in a memory card using an EEPROM as semiconductor memory, the recorded contents in the EEPROM become inconsistent with the contents of the link table in case of card removal during operation or a power failure, and a subsequent data write/read operation will not normally be performed.

SUMMARY OF THE INVENTION

The present invention has been made in consideration of the above circumstances, and an object of the invention is to provide a very excellent memory card apparatus capable of maintaining the correspondency between the recorded contents in the EEPROM and the contents in the link table as much as possible.

Another object of the invention is to provide a very excellent memory card apparatus capable of monitoring the internal state of the standardized card from the outside without departing from the standardized conditions.

Still another object of the invention is to provide a very excellent memory card apparatus capable of freely rewriting data in units of write data, even if an erase data unit differs from a write data unit.

According to one aspect of the present invention, there is provided a memory card apparatus having an EEPROM as a semiconductor memory, in which when data is written in the EEPROM, an external address set for writing data in the EEPROM is associated with an actual address for data write in the EEPROM via a link table, and link data is rewritten and managed in the link table in the state in which the data write in the EEPROM has been completed, wherein at least one flag region is provided in the link table, a flag of the flag region is set when data write in the EEPROM is requested, and the flag of the flag region is reset when the link data has completely been written in the link table.

According to the above structure, the link table has a flag region with a flag which is set when data write in the EEPROM is reset when the link data has completely been written in the link table. In case of card removal during operation or power failure, the flag set in the flag area of the link table is not reset and remains. Thus, by checking the flag region of the link table, the occurrence of card removal during operation or power failure can be detected, and various countermeasures can be conducted. Thus, the correspondency between the recorded contents in the EEPROM and the contents in the link table can be maintained as much as possible.

BRIEF DESCRIPTION OF THE DRAWINGS

FIG. 1 shows comparison data on advantages/disadvantages between an SRAM card and an EEPROM card;

FIG. 2 is a block diagram showing the structure of a memory card having a defect-compensation function for compensating a defective memory region in an EEPROM;

FIG. 3 is a block diagram showing the structure of a memory card apparatus according to a first embodiment of the present invention;

FIG. 4A and FIG. 4B are views for explaining modifications of the first embodiment;

FIG. 5 is a view for explaining still another modification of the first embodiment;

FIG. 6 is a block diagram for explaining still another modification of the first embodiment;

FIG. 8 is a view for explaining an operation of outputting card status information in the second embodiment;

DETAILED DESCRIPTION OF THE PREFERRED EMBODIMENTS

Figure 7:
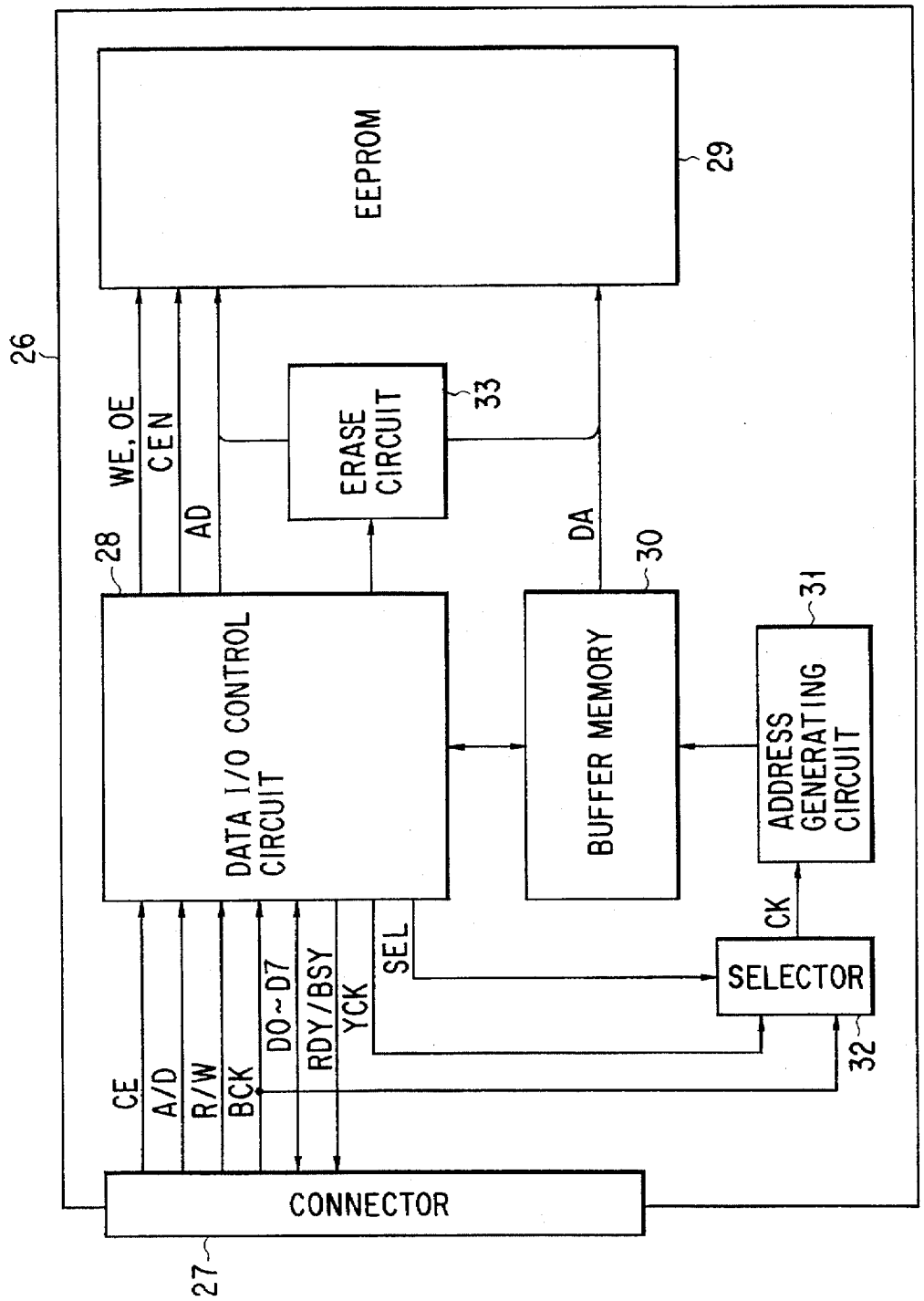
FIG. 7 is a block diagram showing a second embodiment of the invention.

A first embodiment of the present invention will now be described with reference to the accompanying drawings.

Referring to FIG. 3, an external address for data write is supplied to a memory card 15. Specifically, the address is supplied to a control circuit 16 within the memory card 15. The control circuit 16 searches for an actual address in an EEPROM (main memory) 17 which corresponds to the input external address, by referring to a link table 18 constituted by an EEPROM.

The control circuit 16 supplies to the EEPROM 17 an actual address obtained by referring to the link table 18. Data to be written is written at the actual address. Thereafter, the control circuit 16 writes in the link table 18 data representing the quantity of written data in the EEPROM 17, i.e. data representing the address in the EEPROM 17 up to which data has been written. Thus, the data write process is completed.

A microcomputer 19 is provided within the memory card 15. The microcomputer 19 sets a flag in a 1-bit flag region F provided within the link table 18, when it detects that an external data write address has been input and data write has been requested. Then, the microcomputer 19 performs a sequence of data write operations associated with the EEPROM 17. When the microcomputer 19 detects the completion of a rewrite operation in the link table 18, it resets the flag set in the flag region F.

According to the above structure, when the memory card is removed during data write operation ("card removal during operation") or a power failure occurs, the flag set in the flag region F of the link table 18 is not reset and remains. Thus, the occurrence of the card removal during operation or power failure can be detected by checking the flag region F in the link table 18, and various countermeasures can be performed. Therefore, the correspondency between the recorded contents in the EEPROM 17 and the contents in the link table 18 can be maintained as much as possible.

FIGS. 4A and 4B show modifications of the first embodiment of the invention.

In FIG. 4A, the link table 18 is provided with link data areas 181, 182, 183, . . . for storing link data relating to the correspondency between data memory regions in the EEPROM 17 and externally input addresses. The link data areas 181, 182, 183, . . . have 1-bit flag areas 181a, 182a, 183a, . . . , respectively.

When the microcomputer 19 has detected a request for data write, it sets flags in the flag areas 181a, 182a, 183a, . . . in areas 181, 182, 183, . . . of the link table 18 which are associated with the data memory regions in the EEPROM 17. Then, the microcomputer 19 performs a sequence of data write operations associated with the EEPROM 17. When the microcomputer 19 has detected the completion of the link data write in the associated areas 181, 182, 183, . . . in the link table 18, it resets the flags set in the flag areas 181a, 182a, 183a, . . . .

With the above structure, in the case of the card removal during operation or power failure, the flags set in the flag areas 181a, 182a, 183a, . . . in the areas 181, 182, 183, . . . of the link table 18 are not reset and remain. Thus, by checking the flag areas 181a, 182a, 183a, . . . in the areas 181, 182, 183, . . . of the link table 18, the areas 181, 182, 183, . . . which are not consistent with the recorded contents in the EEPROM 17 can be easily found and the defect-compensation processing can be performed. Therefore, the correspondency between the recorded contents in the EEPROM 17 and the contents in the link table 18 can be maintained as much as possible.

According to the modification shown in FIG. 4B, the flag areas 181a, 182a, 183a, . . . associated with the areas 181, 182, 183, . . . in the link table 18 are provided collectively in an empty region 18a in the link table 18. The same advantage as in the modification of FIG. 4A can be obtained, and the areas 181, 182, 183, . . . which are not associated with the recorded contents in the EEPROM 17 can easily be found.

FIG. 5 shows another modification of the first embodiment. Suppose that it has been detected by the means of the above embodiment that the contents of data memory regions 171, 172, . . . , 17n in the EEPROM 17 correspond normally to the link data recorded in the areas 181, 182, . . . 18n of the link table 18 and the correspondency between the contents in a memory region 17m in the EEPROM 17 and the link data in an area 18m of the link table 18 is lost owing to card removal during operation or power failure.

In this case, the contents of the memory regions 171, 172, . . . , 17n and the contents of the areas 181, 182, . . . , 18n are once saved in another memory by using, e.g. a personal computer, and then the EEPROM 17 and link table 18 are totally initialized (all memory regions are erased). Thereafter, the saved data is written in the EEPROM 17 and link table 18 once again.

Specifically, the memory region 17m which does not correspond to the link table 18 remains as a defect in the EEPROM 17, and a problem will occur in the case of overwrite, as stated above. To solve this problem, the mutually corresponding contents of the memory regions 171, 172, . . . , 17n and areas 181, 182, . . . , 18n are saved in another memory, and then all memory regions in the EEPROM 17 and link table 18 are initialized. Thereafter, the saved data is written in the EEPROM 17 and link table 18 once again, thereby recovering the contents of the memory card in the state just prior to the card removal during operation or power failure.

FIG. 6 shows still another modification of the first embodiment. Two link tables 20 and 21 are provided within the memory card 15. Normally, a microcomputer 22 controls switches 23 and 24, thereby performing link data write/read operations for the link table 20. In the case of executing the link data rewrite in the link table 20, when the rewrite operation is normally completed, the contents of the link table 20 are automatically copied to the link table 21.

When the microcomputer 22 determines that the card removal during operation or power failure has occurred, a comparison circuit 25 compares the contents of the two link tables 20 and 21. If the contents of the two link tables 20 and 21 do not coincide, the contents of the link table 21 is amended on the basis of the contents of the link table 20, thereby recovering the contents of the memory card 15 in the state just prior to the card removal during operation or power failure.

In addition to the above, various methods for protecting the link data can, of course, be performed by making use of the two link tables 20 and 21.

According to the above embodiment and modifications, even if the card removal during operation or power failure has occurred, the correspondency between the recorded contents in the EEPROM 17 and the contents in the link table 18 can be maintained as much as possible.

The system of the memory card using the EEPROM as semiconductor memory tends to be complex, unlike the memory cards using the SRAM or DRAM. Because of such complexity, it is desired to monitor the internal condition of the memory card from the outside. However, regarding the current EEPROM memory card, it is not standardized that the card has a card status information output mode by which card status information relating to the card detection bit and/or the number of bytes of input addresses is output to the outside. In addition, there is a problem that the internal condition of the card cannot be grasped only by the card status information.

Thus, it is necessary to exactly monitor the internal condition of the card from the outside, without departing from the standardized conditions.

FIG. 7 shows a detailed structure of a memory card 26 according to a second embodiment of the invention. The memory card 26 is connected to an electronic still camera or the like (not shown) via a connector 27 provided at one end portion of the memory card 26. The connector 27 receives, from the electronic still camera, digital data DA to be written in the memory card 26 and address data AD representing a location for data write. The digital data DA and address data AD are supplied to a data input/output (I/O) control circuit 28 including a CPU via bus lines D0 to D7.

In addition, the connector 27 receives, from the electronic still camera, a card enable signal CE having an H (High) level when the memory card 26 is selected, an address/data switch signal A/D having an L (Low) level when the data supplied to the bus lines D0 to D7 are address data AD and having an H level when these data are digital data DA, a read/write switch signal R/W having an L level when data write to the EEPROM is requested and having an H level when data read from the EEPROM is requested, and a bus clock BCK synchronized with the address data AD.

The card enable signal CE, address/data switch signal A/D, read/write switch signal R/W and bus clock BCK are also supplied to the data I/O control circuit 28. A data erase command to erase data in the EEPROM 29 is also supplied from the electronic still camera to the data I/O control circuit 28 via the connector 27. The data I/O control circuit 28 produces a ready/busy switch signal RDY/BSY having an H level when input of digital data DA from the electronic still camera is allowable and having an L level when the input of digital data DA is not allowable.

The outline of the operation of the above apparatus will now be described. The digital data DA supplied to the connector 27 is stored in a buffer memory 30 by the control of the data I/O control circuit 28 at a timing controlled by address data output from an address generating circuit 31. The address generating circuit 31 counts clocks CK selected by a selector 32, thereby generating address data to be supplied to the buffer memory 30. The selector 32 receives the bus clock BCK and a clock YCK output from the data I/O control circuit 28.

When the digital data DA is stored in the buffer memory 30, the selector 32 is operated by a select signal SEL output from the data I/O control circuit 28, thereby selecting the bus clock BCK and delivering it to the address generating circuit 31 as the clock CK. Thus, the digital data DA fed to the connector 27 from the electronic still camera is written in the buffer memory 30 in accordance with the address data generated on the basis of the bus clock BCK.

When the write of digital data DA in the buffer memory 30 is completed, the data I/O control circuit 28 controls the select signal SEL and switches the selector 32 to deliver the clock YCK generated by the controller 28 itself to the address generating circuit 31. Thus, the digital data DA is read out from the buffer memory 30 in response to the address data generated from the address generating circuit 31 on the basis of the clock YCK.

At this time, the data I/O control circuit 28 outputs a chip enable signal CEN and a write enable signal WE, as well as address data AD, to the EEPROM 29 comprising a plurality of chips. Thereby, the digital data DA read out from the buffer memory 30 is written in the EEPROM 29 in units of a page consisting of, e.g 512 bytes. In the state in which the digital data DA has been written in the EEPROM 29, the data I/O control circuit 28 delivers an out-enable signal OE and the address data AD, which previously designated the data write address, to the EEPROM 29, thereby reading out the digital data DA from the EEPROM 29 and comparing the read-out digital data DA with the digital data DA recorded in the buffer memory 30. That is, the write verify is executed.

If the digital data DA read out from the EEPROM 29 does not coincide with the digital data DA recorded in the buffer memory 30, the data I/O control circuit 28 transfers once again the digital data DA from the buffer memory 30 to the EEPROM 29 to write it in the EEPROM 29. This operation is repeated until the digital data DA read out from the EEPROM 29 coincides perfectly with the digital data DA recorded in the buffer memory 30. Thus, the digital data DA is written in the EEPROM 29.

When a data erase command is input from the electronic still camera to erase data in the EEPROM 29, the data I/O control circuit 28 drives an erase circuit 33 in accordance with the erase command. The erase circuit 33 is controlled by the data I/O control circuit 28 to output erase signals to an address line and a data line in the EEPROM 29, thereby electrically chip-erasing or page-erasing the EEPROM 29. The erase circuit 33 may be provided within the EEPROM 29. In this case, the erase command is generated from the data I/O control circuit 28 to the EEPROM 29, and the erase circuit within the EEPROM 29 receives the erase command and performs the erase operation.

Next, the operation for reading out the digital data DA from the EEPROM 29 to the outside of the memory card 26 will now be described. A read-out command and an address associated with data to be read out are input from the electronic still camera via the connector 27. Then, the data I/O control circuit 28 outputs the chip enable signal CEN, out-enable data OE, and address data AD to the EEPROM 29, thereby reading out the digital data DA from the EEPROM 29 in units of a page. In addition, the control circuit 28 switches the selector 32 to deliver the clock YCK generated from the control circuit 28 itself to the address generating circuit 31. Thus, the read-out digital data DA is written in the buffer memory 30.

Thereafter, the data I/O control circuit 28 switches the selector 32 to deliver the bus clock BCK supplied from the electronic still camera via the connector 27 to the address generating circuit 31. The data in the buffer memory 30 is read out in accordance with the address data generated from the address generating circuit 31 on the basis of the bus clock BCK, and the read-out digital data DA is supplied to the electronic still camera via the connector 27.

A standardized mode for reading out card status information will now be described. The above-described write/read operations of digital data DA associated with the EEPROM 29 will now be analyzed from the viewpoint of the outside of the memory card, i.e. from the viewpoint of input/output signals flowing through the connector 27. When the digital data DA is written in or read out from the memory card 26, the card enable signal CE is set at the H-level to select the memory card 26, and both the address/data switch signal A/D and read/write switch signal R/W are set at the L-level (the address input state/the write state). In addition, the address data AD is supplied to the bus lines D0 to D7 to set the address. Then, the address/data switch signal A/D is set at the H-level (the data input state), thereby writing/reading digital data DA in/from the memory card 26.

Thus, in the normal write/read operations, when the address is set, both the address/data switch signal A/D and read/write switch signal R/W are set at the L-level. As is shown in FIG. 8, when the address/data switch signal A/D is set at the L-level and the read/write switch signal R/W is set at the H-level (this state is not possible in an address setting operation in the ordinary write/read operations), the data I/O control circuit is designed to deliver card status information as digital data DA to the bus lines D0 to D7. In this standardized output mode of card status information, the bus clock BCK is not used.

Figure 9:
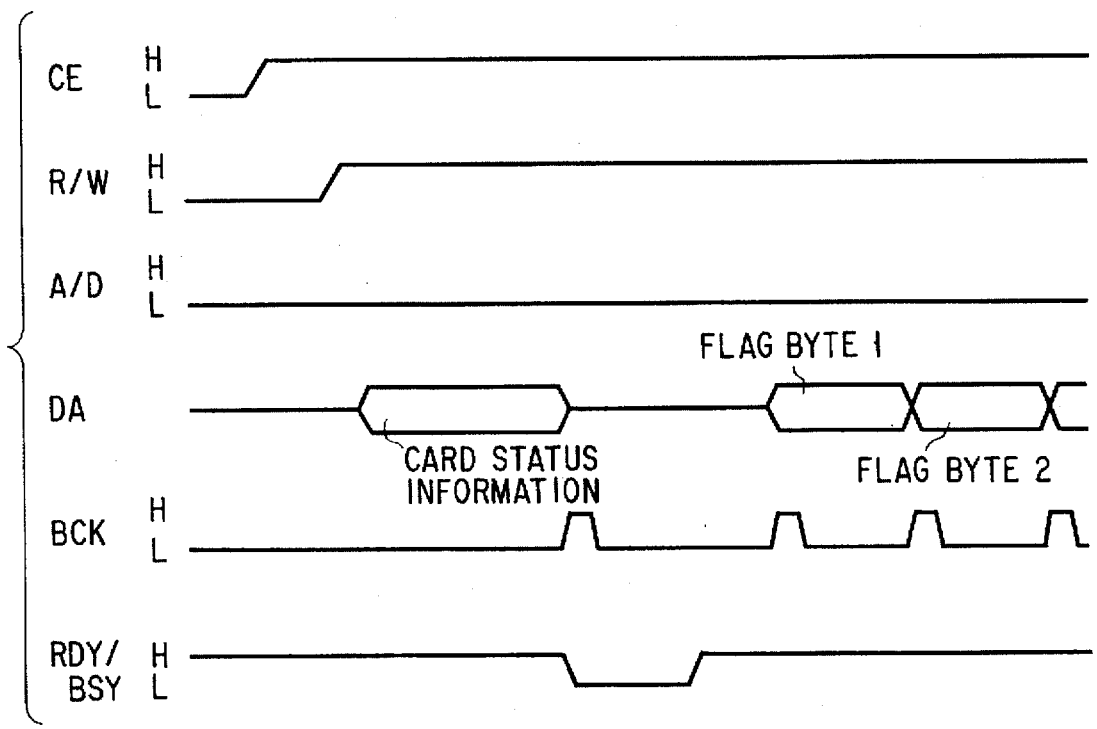
FIG. 9 is a view for explaining an operation of outputting flag bytes in the second embodiment.

In the above-mentioned card status information output state, when the bus clock BCK is supplied, as shown in FIG. 9, the data I/O control circuit 28 stops delivering the card status information to the bus lines D0 to D7 synchronous with the first bus clock BCK and starts delivering flag bytes 1, 2, . . . to the bus lines D0 to D7 in synchronism with the second and subsequent bus clocks BCK. The flag bytes 1, 2, . . . indicate, for example, an error occurrence at "10000000", an end of life of card at "11000000", card removal during operation (memory card 26 is removed during data transfer between the card and the electronic still camera) at "10010000", a need to call a serviceman due to an error in the card at "10001000", erroneous address designation at "10000100", and write protect at "10000010".

When the bus clock BCK is supplied in the card status information output state, the data I/O control circuit 28 sets the ready/busy switch signal RDY/BSY synchronous with the first bus clock BCK to prevent the input from the outside, and the control circuit 28 sets the flag bytes 1, 2, . . . in an output register (not shown) within the card. After the flag bytes 1, 2, . . . are set in the output register, the data I/O control circuit 28 sets the ready/busy switch signal RDY/BSY at the H-level and delivers the flag bytes 1, 2, . . . to the bus lines D0 to D7 synchronous with the second and subsequent bus clocks BCK.

According to the above structure, when the bus clock BCK is supplied in the card status information output state, the flag bytes 1, 2, . . . representing the internal condition of the memory card 26 are output. Thus, without departing from the standardized condition for the output of card status information, the internal condition of the memory card 26 can be exactly monitored from the outside by means of the flag bytes 1, 2, . . . .

In the EEPROM, the data erase is performed in units of a block, and the data write is performed in units of a page. Since the erase data unit is several times greater than the write data unit, it is difficult to replace the already recorded data in the EEPROM with new data in units of write data.

Figure 10:
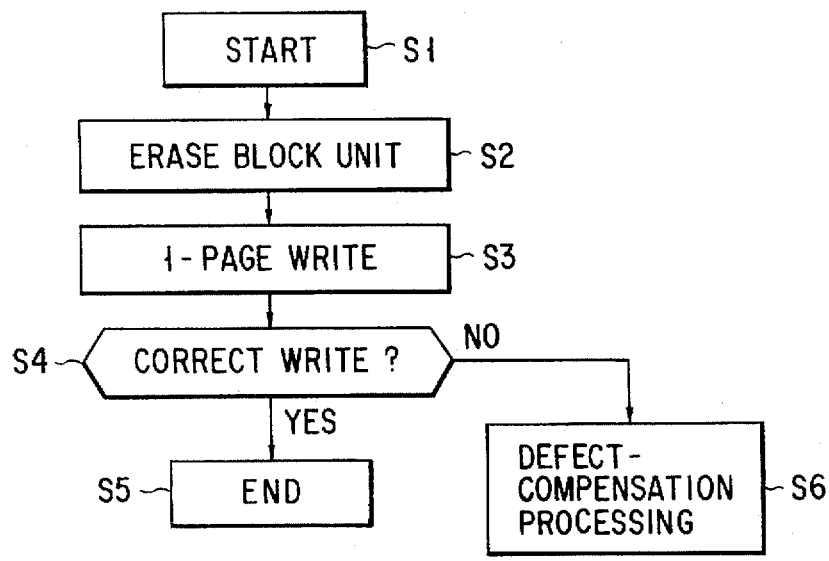
FIG. 10 is a flow chart for describing a data rewrite operation in an EEPROM.

FIG. 10 is a flow chart for explaining an ordinary data rewrite operation for one page. When the rewrite operation starts (step S1), a block unit is erased (step S2), following which 1-page data is written (step S3). In the subsequent step S4, write verify operations are performed a predetermined number of times, thereby determining whether the data write has been correctly performed. If the data write is correct (YES), the rewrite operation is completed (step S5). If the data write is not correct (NO), the page associated with the data write is determined to be a defective page and defect-compensation processing is performed. In the defect-compensation processing, an alternative empty page is found and the data is written in the empty page.

Figures 11A, 11B, 11C:
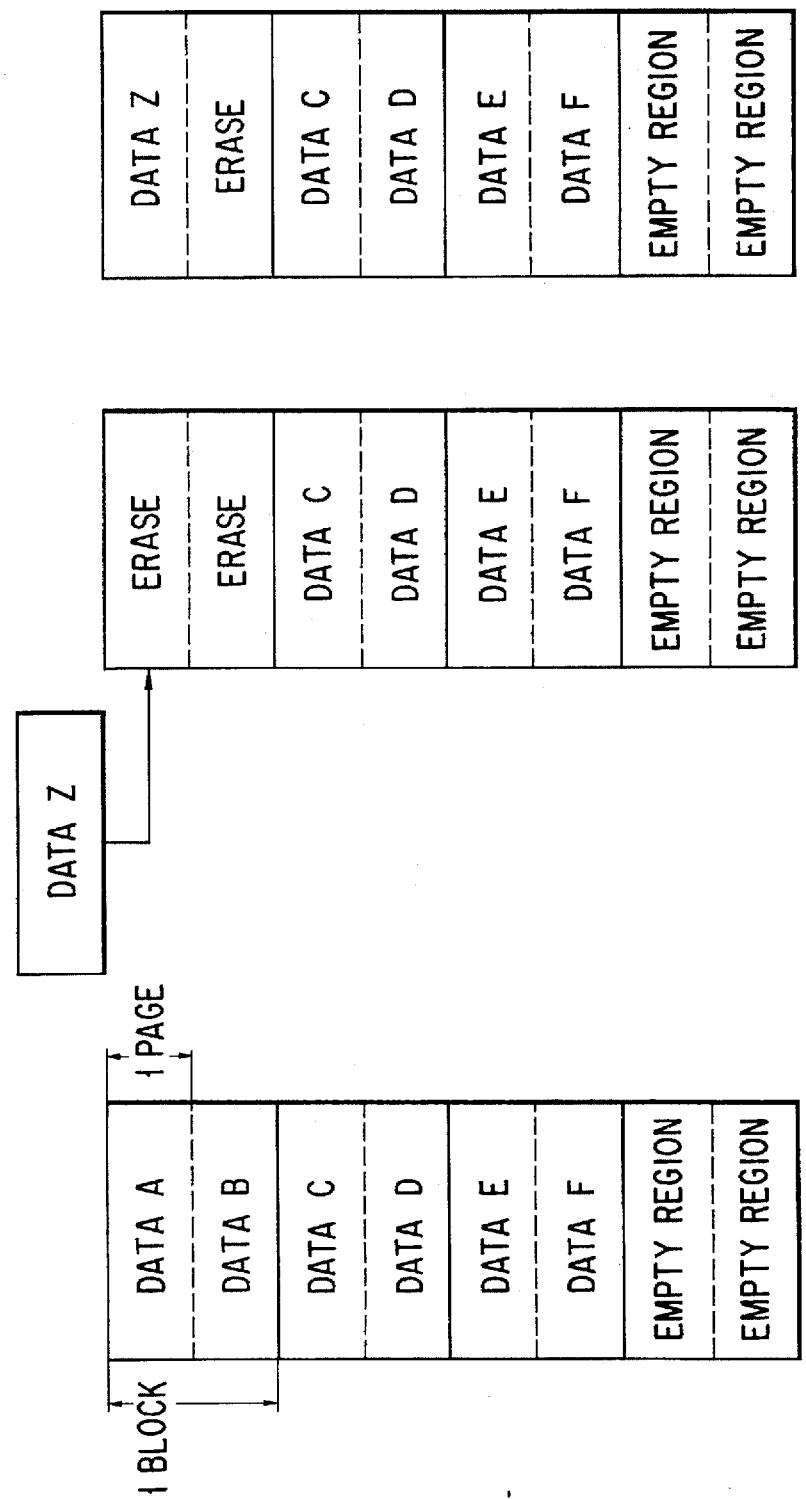
FIGS. 11A to 11C are views for explaining a problem in the data rewrite operation described with reference FIG. 10.

In the above data rewrite operation, however, the following problem occurs. Suppose that one block consists of two pages, as shown in FIG. 11A, and data A, B, C, D, E and F are recorded in the pages of three blocks. When data A is replaced by data Z, the entire block including the region of the data A is erased, as shown in FIG. 11B, and then the data Z is written in the region of the data A. Consequently, the data B which is not related to the data rewrite is lost, as shown in FIG. 11C.

It is therefore necessary to freely rewrite data in units of write data even if the erase data unit differs from the write data unit.

Figure 12:
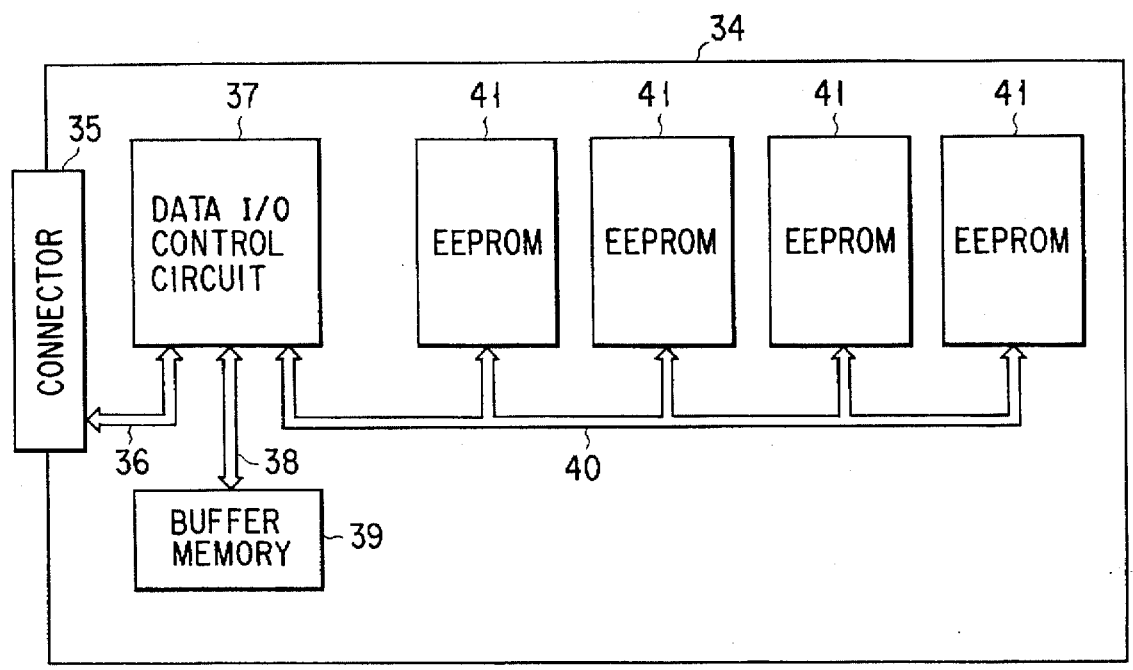
FIG. 12 is a block diagram showing a third embodiment of the invention.

FIG. 12 shows a third embodiment of the invention, wherein a memory card 34 is connected to an electronic still camera (not shown) via a connector 35 provided at one end of the card 34. The connector 35 receives, from the electronic still camera, data to be written in the memory card 34, address data representing a write location, etc.

The data delivered to the connector 35 is input to a data I/O control circuit 37 via a bus line 36. The data I/O control circuit 37 is connected via a bus line 38 to a buffer memory 39 capable of high-speed data write and read. The input data is once stored in the buffer memory 39. Then, the control circuit 37 reads out the data from the buffer memory 39 and writes the read-out data in a plurality of EEPROMs 41 (four EEPROMs in FIG. 12) at a timing corresponding to the write cycle of the EEPROMs 41.

In this case, each time the data of, e.g. a page unit is written in the EEPROM 41, the data I/O control circuit 37 performs a write verify operation. In the write verify operation, the page-unit data written in the EEPROM 41 is read out and compared with the data recorded in the buffer memory 39. when the data read out from the EEPROM 41 does not coincide with the data recorded in the buffer memory 39, the data I/O control circuit 37 transfers once again the data from the buffer memory 39 to the EEPROM 41 and writes it in the EEPROM 41. This operation is repeated a predetermined number of times, and when the data read out from the EEPROM 41 coincides perfectly with the data recorded in the buffer memory 39, the data write is completed.

When the data is read out from the EEPROM 41 to the outside of the memory card 34, an address for designating the data to be read out is supplied from the electronic still camera to the data I/O control circuit 37 via the connector 35. On the basis of the input address, the data I/O control circuit 37 reads out the data from the EEPROM 41 and records it in the buffer memory 39 temporarily. Then, the control circuit 37 reads out the data from the buffer memory 39 and delivers it to the outside via the connector 35. Thus, the data read-out operation is completed.

According to the above structure, the data transfer between the electronic still camera and memory card 34 is always performed via the buffer memory 39. Thus, the data write/read speed in the memory card 34, as viewed from the electric still camera side, can be increased. In addition, the write verify processing, which is peculiar to the EEPROM 41, is automatically performed within the memory card 34 by use of the buffer memory 39. Thus, the memory card 34 can be handled like the SRAM card.

Figure 13:
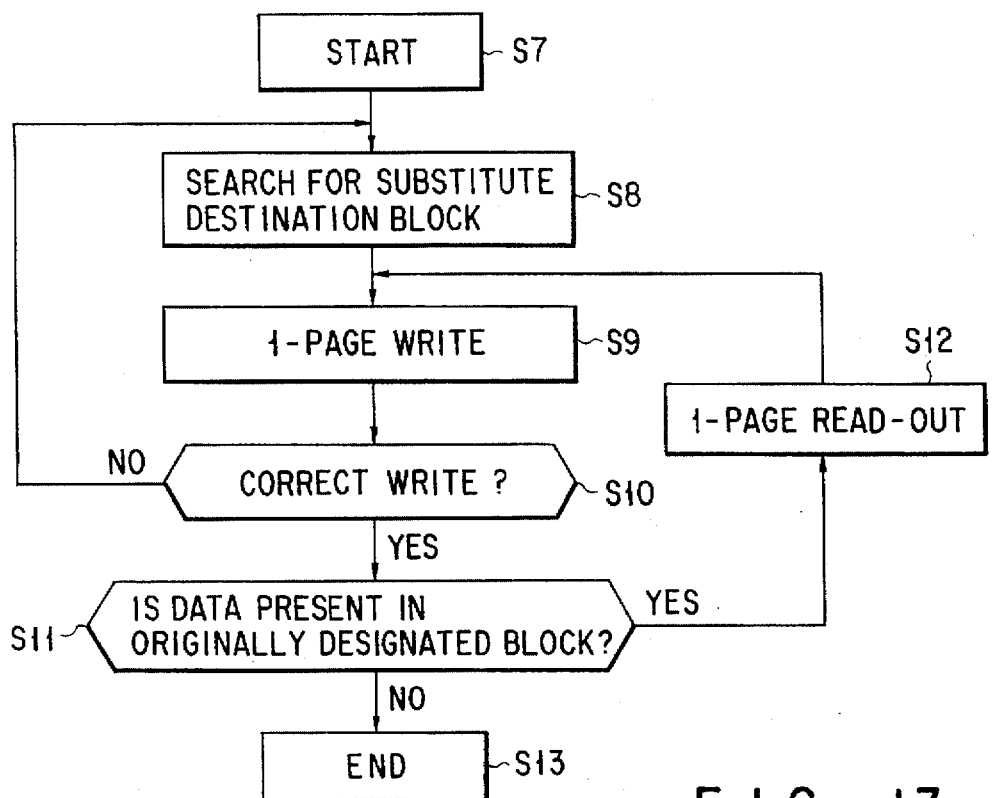
FIG. 13 is a flow chart for describing the operation of the third embodiment.

FIG. 13 is a flow chart illustrating the data write operation for one page. When the write operation starts (step S7), the data I/O control circuit 37 searches for an erased empty block ("substitute destination block") within the EEPROM 41 (step S8). New data is written in one page of the substitute destination block (step S9). In step S10, the data I/O control circuit 37 performs the write verify operation a predetermined number of times and checks whether the data is correctly written. If the data write is not correct (NO), the page in the substitute destination block is determined to a defective page, and the control routine returns to step S8 to search for another substitute destination block.

If the data write is correct (YES) in step S10, the data I/O control circuit 37 determines whether the block ("originally designated block") including the page associated with data rewrite contains another page with recorded data (step S11). If YES in step S11, the data of the page which is not associated with the data rewrite is read out (step S12) and the processing in step S9 is performed once again. The read-out data is written in a page of a newly found substitute destination block. If the originally designated block includes no other page which contains data but is not associated with the data rewrite (NO), the rewrite operation is completed (step S13).

Figure 14B:
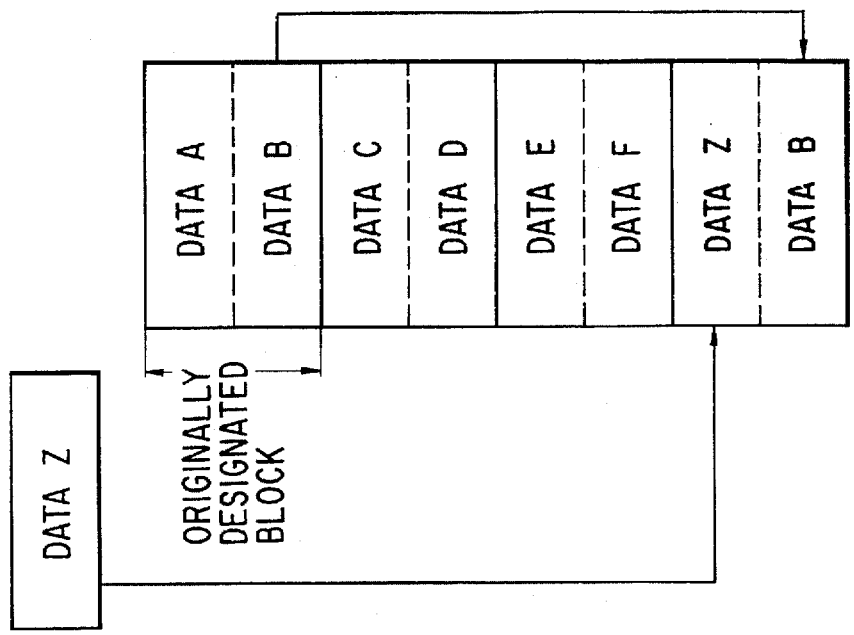
FIGS. 14A and 14B are views for specifically explaining the operation of the third embodiment.
Figure 14A:
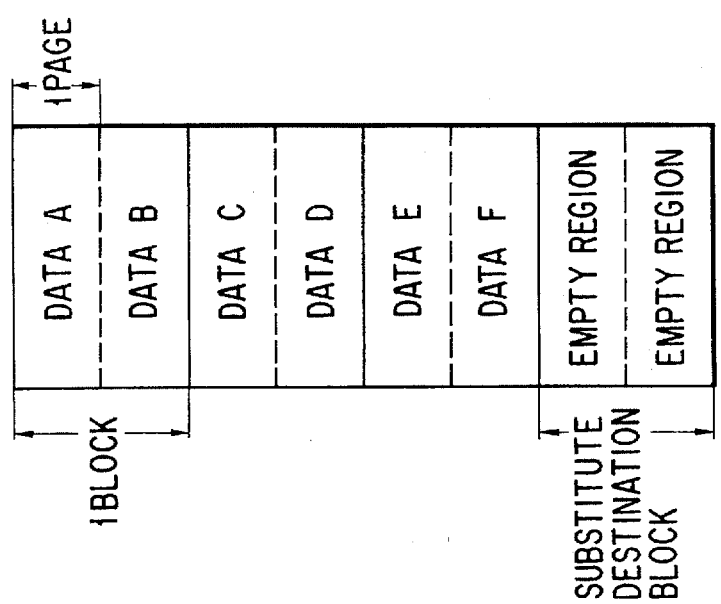

More specifically, suppose that one block consists of two pages and the pages of three blocks store data A, B, C, D, E and F, as shown in FIG. 14A. When the data A is replaced by data Z, the data I/O control circuit 37 searches for a substitute destination block in the EEPROM 41. As is shown in FIG. 14B, the new data Z is written in one page of the substitute destination block. Thereafter, the data I/O control circuit 37 determines that the data Z has correctly been written and, in this state, checks whether the originally designated block contains another page which contains data but is not associated with the data rewrite. Since the originally designated block contains the page with the data B, the data B is read out from this page and written in the other page of the substitute destination block. The data I/O control circuit 37 writes, e.g. in an internal register, record data to the effect that when the address of the block of the data A and B (the originally designated block) is designated from the electronic still camera, this address is changed to the address of the substitute destination block. Thus, the data rewrite from data A to data Z is completed.

According to the above structure, the substitute destination block capable of data write is searched, and new data Z is written in one page of the substitute destination block. Then, the data B in the originally designated block is written in the other page of the substitute destination block. The address of the originally designated block is associated with the address of the substitute destination block, when the memory card system is viewed from the outside of the card. Thus, unlike the prior art, the data B of the originally designated block is not unnecessarily erased, and the data A is replaced by the new data Z.

In the above embodiment, the data A and B are left in the originally designated block. However, the originally designated block may be erased in units of a block and used for the next write operation. Further, if the originally designated block is erased on a block-unit basis and then the data Z and B are transferred to the originally designated block, the data A is replaced by the data Z at the same location on the memory map of the EEPROM 41. In this case, it is not necessary to associate the address of the originally designated block with the address of the substitute destination block, and this is very convenient. It is also possible to set a predetermined amount of empty block as a substitute destination block in the EEPROM 41.

The present invention is not limited to the above embodiments, and various modifications and changes may be made without departing from the spirit of the invention.

What is claimed is:

1. A memory card apparatus comprising:
   a link table for managing link data;
   an EEPROM, an external address for writing data in the EEPROM being associated with an actual address of the EEPROM via the link data in the link table, the link data being written and managed in the link table when data has been completely written in the EEPROM; and
   a flag region that indicates whether writing of the link data in the link table is incomplete, wherein a flag of the flag region is set when a data write in the EEPROM is requested, and wherein the flag of the flag region is reset when the link data has been completely written in the link table,
   wherein card status information is output when an address/data switch signal represents an address input and a read/write switch signal is set in a data read-out state, and
   wherein a bus clock is transmitted by a card connector during a card status information output state, and a flag byte representing an internal condition of the memory card apparatus, which cannot be found in the card status information, is output in place of card status information in response to the bus clock.

2. The memory card apparatus according to claim 1, wherein said flag region includes a plurality of flag areas which are associated with a plurality of link data regions provided in advance in the link table for recording the link data.

3. The memory card apparatus according to claim 1, further comprising control means for reading data in the EEPROM which is associated with the link data in the link table, and for storing the data read from the EEPROM, and then writing the stored data in the EEPROM once all memory regions in the EEPROM have been erased.

4. The memory card apparatus according to claim 1, wherein the link table comprises:

a first link table in which the link data is written once the data has been written in the EEPROM; and a second link table into which the contents of the first link table is transferred once the link data has been written in the first link table, and wherein when the contents of the first link table do not coincide with the contents of the second link table, the contents of the second link table are corrected on the basis of the contents of the first link table.

5. The memory card apparatus according to claim 1, wherein the flag byte represents message relating to at least one error condition including an end of life of the memory card apparatus, a fault, card removal during operation, a need to call a serviceman, erroneous address designation, and a write protect condition.

6. The memory card apparatus according to claim 1, wherein the internal condition represented by the flag byte includes at least one of an error occurrence, an operation during which the card is removed or power is terminated, an erroneous address designation, and a write protection.

7. The memory card apparatus according to claim 1, wherein the EEPROM comprises an erased data unit which is larger in size than a written data unit.

8. The memory card apparatus according to claim 7, wherein when a data write operation is requested, an empty record region in the EEPROM corresponding in size to the erased data unit is found, and a first data block to be written into the EEPROM and a third data block taken from a data block to be erased are written in units of written data into the found empty record region, the third data block being contained in a record region of the erased data unit which includes a second data block to be replaced by the first data block but which is not related to the first data block.

9. A memory card apparatus comprising:

a link table for managing link data;

an EEPROM, an external address for writing data in the EEPROM being associated with an actual address of the EEPROM via the link data in the link table, the link data being written and managed in the link table when data has been completely written in the EEPROM; and a flag region located in the link table, the flag region indicating whether writing of the link data in the link table is incomplete, wherein a flag of the flag region is set when a data write in the EEPROM is requested, and wherein the flag of the flag region is reset when the link data has been completely written in the link table, wherein card status information is output when an address/data switch signal represents an address input and a read/write switch signal is set in a data read-out state, and wherein a bus clock is transmitted by a card connector during a card status information output state, and a flag byte representing an internal condition of the memory card apparatus, which cannot be found in the card status information, is output in place of card status information in response to the bus clock.

10. The memory card apparatus according to claim 9, wherein said flag region includes a plurality of flag areas which are associated with a plurality of link data regions provided in advance in the link table for recording the link data.

11. The memory card apparatus according to claim 9, further comprising control means for reading data in the EEPROM which is associated with the link data in the link table, and for storing the data read from the EEPROM, and then writing the stored data in the EEPROM once all memory regions in the EEPROM have been erased.

12. The memory card apparatus according to claim 9, wherein the link table comprises:

a first link table in which the link data is written once the data has been written in the EEPROM; and a second link table into which the contents of the first link table is transferred once the link data has been written in the first link table, and wherein when the contents of the first link table do not coincide with the contents of the second link table, the contents of the second link table are corrected on the basis of the contents of the first link table.

13. The memory card apparatus according to claim 9, wherein the flag byte represents message relating to at least one error condition including an end of life of the memory card apparatus, a fault, card removal during operation, a need to call a serviceman, erroneous address designation, and a write protect condition.

14. The memory card apparatus according to claim 9, wherein the EEPROM comprises an erased data unit which is larger in size than a written data unit.

15. The memory card apparatus according to claim 14, wherein when a data write operation is requested, an empty record region in the EEPROM corresponding in size to the erased data unit is found, and a first data block to be written into the EEPROM and a third data block taken from a data block to be erased are written in units of written data into the found empty record region, the third data block being contained in a record region of the erased data unit which includes a second data block to be replaced by the first data block but which is not related to the first data block.

16. The memory card apparatus according to claim 9, wherein the internal condition represented by the flag byte includes at least one of an error occurrence, an operation during which the card is removed or power is terminated, an erroneous address designation, and a write protection.

* * * * *